Sept. 6, 1966 J. R. DAVIS 3,271,777

MAGNETIC DIGITAL RECORDER

Filed Nov. 15, 1961 3 Sheets-Sheet 1

INVENTOR

John R. Davis

BY Adolph C Hugin

ATTORNEY

INVENTOR
John R. Davis

BY Adolph C. Hugin
ATTORNEY

Sept. 6, 1966 J. R. DAVIS 3,271,777

MAGNETIC DIGITAL RECORDER

Filed Nov. 15, 1961 3 Sheets-Sheet 3

INVENTOR
John R. Davis

BY Adolph C. Hugin
ATTORNEY 3,271,777

MAGNETIC DIGITAL RECORDER

John R. Davis, Shreveport, La., assignor to United Gas Corporation, a corporation of Delaware Filed Nov. 15, 1961, Ser. No. 152,452

12 Claims. (Cl. 346—74)

This invention relates to recording devices and more particularly to magnetic digital recorders.

The present invention is an improvement of the magnetic digital recorder disclosed and claimed in copending U.S. patent application Serial No. 165,717 filed January 4, 1962, and assigned to the same assignee as the present application.

Recording devices of various types are used for many purposes in modern business and industry, and the increase in complexity of keeping records, particularly in the volume of units, readings, etc. which may be handled, has resulted in recorders which are generally rather bulky and in the form of desk or floor type equipment. For many purposes this restricts the use of such recorders.

The present invention provides a portable magnetic digital recorder of relatively small size, which is simple to operate and may be constructed to record at relatively low speeds digits and instructions in any of several desired codes. It is a device of the type which is especially useful in the acquisition of data for a computing system, and its flexibility is greatly enhanced in that an end-of-word record is made automatically at the end of each composite entry and an error record can easily be made which will instruct a computer to disregard the last previous word and to substitute therefor the following word. In addition, all of the entries in a word can be visibly checked prior to a recording of the word, so that the chance of erroneous entries is minimized.

Such a recorder can be used for any purpose in which listings of numbers, the preparation of tallies, readings, or the like are required. For example, the device may be used in stores for taking inventories, in railroad yards for checking car numbers, and in reading utility meters for noting the meter number and the amount of the utility consumed. Furthermore, one of the entries can be coded to designate various predetermined information determinations, such as, a symbol or digit representing the fact that the recorded reading has been verified, or a symbol representing that several consecutive entries are incorrect and that a particular folio or written record indicates the last correct entry or the restart point for the correct entry. Information recorded on a magnetizable memory member, such as a magnetic tape, by a device incorporating the present invention, forms a magnetic storage of the information which may be utilized at a subsequent time in a computing system to which it is supplied through a proper interpreter or conversion unit which utilizes the information coded in the magnetic memory member and interprets it with internally generated or precoded instructions which are supplied as input data to the computing system for data processing.

An object of the present invention is to provide a simple portable apparatus for recording data in digital form on a magnetizable memory member.

Another object of this invention is to provide an apparatus for recording on a magnetizable memory member, such as magnetic tape, discrete symbols representative of digits or letters, together with a symbol which defines the end of a word for computer instructions.

A further object of this invention is to provide an apparatus for magnetically recording symbols by a multiple track recording head energized through a diode matrix which provides for energization of one or more selected tracks in accordance with a symbol to be recorded and which prevents energization of the other tracks of the recording head, together with an arrangement for visibly presetting a series of symbols comprising a word and subsequently consecutively recording these symbols in a predetermined order through the diode matrix.

Still another object of this invention is to provide a magnetic digital recorder having a symbol which, when recorded on tape, will provide instructions to a computer that the preceding entry is in error and that the following entry is to be substituted for the one which has been indicated as being erroneous.

A yet further object of this invention is to provide a device for magnetically recording data in which magnetic tape is kept in accurate contact and in alignment with a multi-channel recording head or heads at all times so as to prevent erratic recordings and to minimize the possibility or errors in the interpretation of the recordations due to substantial misalignments of the recordings in diferen channels on the tape.

A further object of this invention is to provide an improved magnetic digital recorder having means for advancing magnetic tape across a recording head for each recording cycle which assures the advance of a substantially predetermined step or length of tape for each recording cycle and which requires completion of a recording cycle before a new cycle can be initiated.

Still another object of this invention is to provide a device for magnetically recording data in which coded computer instructions may be recorded on tape along with other data.

A further object of this invention is to provide a magnetic digital recorder having means for moving a magnetizable memory member a substantially predetermined step or extent across a multi-channel recording head for each complete recording cycle and having a plurality of symbol switches each adapted to energize one or more selected channels of the recording head through a diode matrix in accordance with a symbol represented by the setting of the respective symbol switch for a substantially predetermined fraction of the step of advance of the magnetizable memory member for each complete operating cycle and in which the diode matrix prevents the energization of other channels of the recording head not representative of the symbol being recorded.

Further objects and advantages of this invention will become apparent from the following description referring to the accompanying drawings, and the features of novelty which characterized this invention will be pointed out with particularity in the claims appended to and forming a part of this specification.

Figure 1:
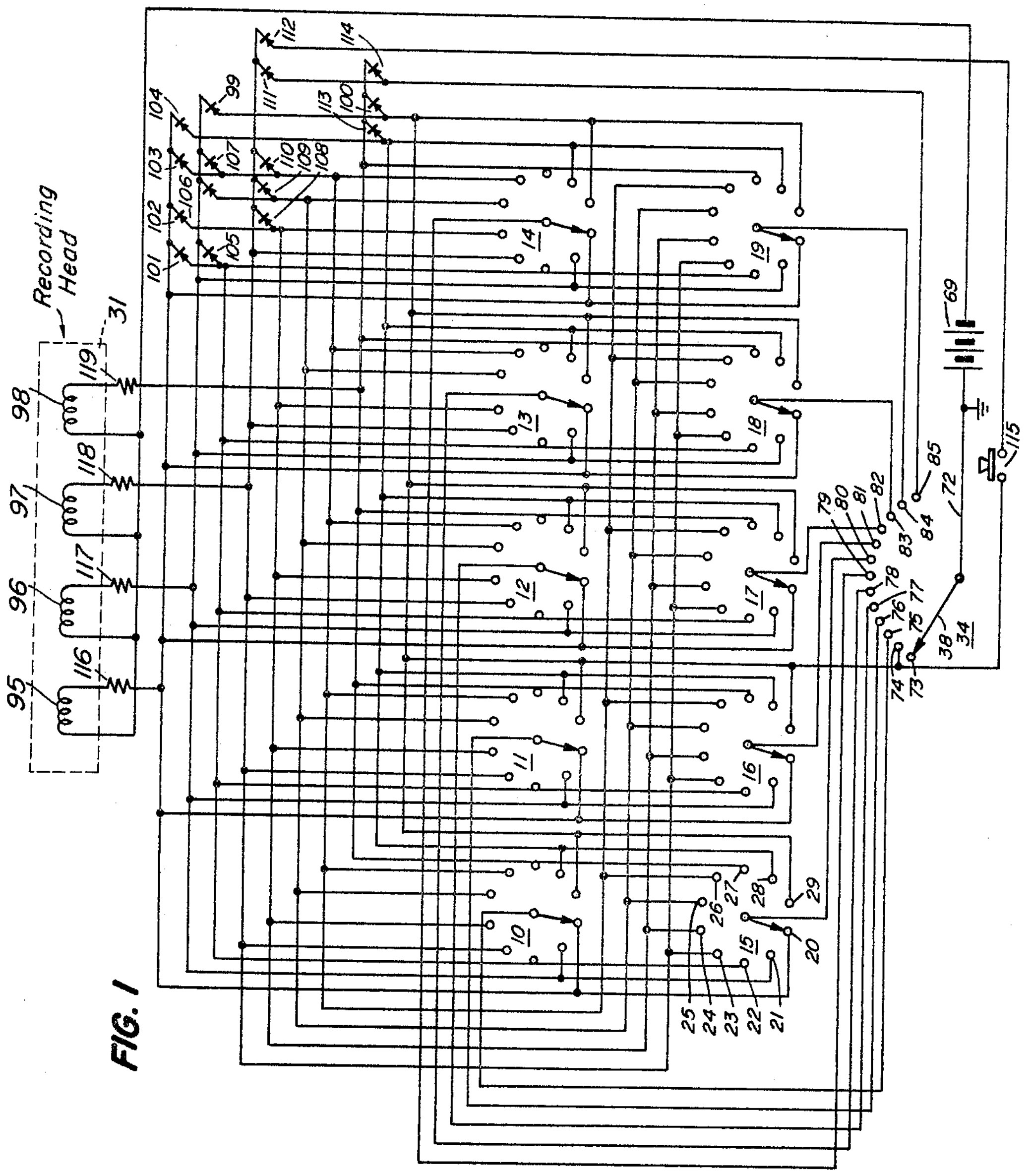
FIG. 1 is a schematic diagram illustrating an embodiment of the present invention wherein a plurality of symbol switches may be set to any of a number of positions to represent data to be recorded when the respective switch is energized through a read-out switch and a diode matrix so as to energize predetermined channels of a recording head.

Referring to the drawings, FIG. 1 schematically illustrates an embodiment of the present improved portable magnetic digital recorder wherein a minimum of parts and connections is required by the utilization of a solid state diode matrix for interconnecting various parts of the recording system. The present invention comprises any suitable circuitry for obtaining the desired coded recording in accordance with certain basic logics. Generally, the decimal system is the more readily understood system of numeration; however, the binary system lends itself more readily to mechanical and electrical computations. It is desirable, therefore, to provide a numerical recorder which enables an operator to express digits in the decimal system for entry in the recorder and to have these decimal digits translated or coded and recorded in a binary or modified binary form. In addition, it is desirable to provide for visual observation of the digits to be recorded prior to their recordation, so that possible inadvertent errors may be corrected prior to recordation on a memory member.

Figure 2:
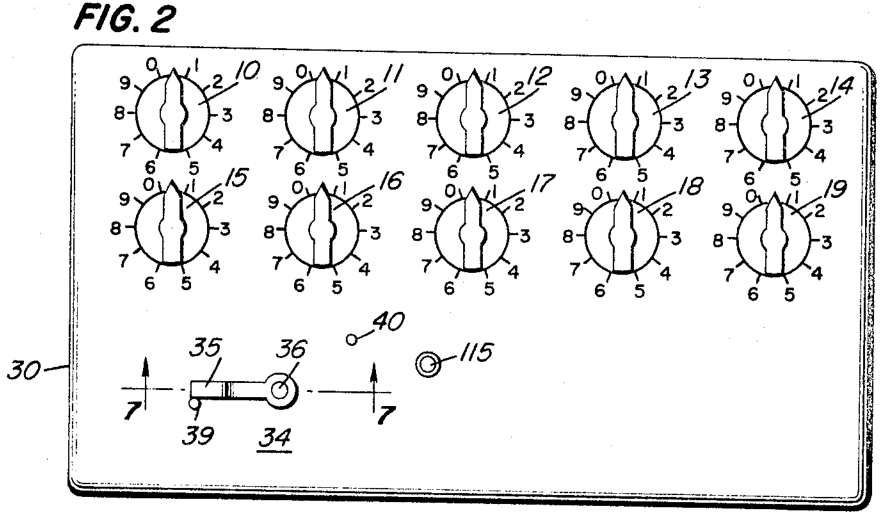
FIG. 2 is a top plan view illustrating a magnetic digital recorder incorporating the system schematically illustrated in FIG. 1.

In FIG. 1, a keyboard comprising a bank of ten symbol switches 10, 11, 12, 13, 14, 15, 16, 17, 18, and 19, is provided for the recordation of ten information symbols. Each of the symbol switches preferably is alike and may conveniently be in the form of a conventional single wafer switch. In the illustrated embodiment, each symbol switch is provided with ten contacts 20, 21, 22, 23, 24, 25, 26, 27, 28, and 29. In order to simplify the illustration of the system the contacts of each of the symbol switches have not been numbered, since each respective contact of each switch is connected in the same manner as the numbered contacts of symbol switch 15. The mounting arrangement of the ten symbol switches is illustrated in FIG. 2, which shows the relative positions of the symbol switches in a recorder housing 30. As shown in this figure, the ten contacts 20 through 29 correspond to positions indicated by decimal digits 1, 2, 3, 4, 5, 6, 7, 8, 9, and 0 respectively.

For illustrative purposes, a binary coded decimal system of numeration utilizing a 1–2–4–8 code is used. With such a code it is possible to use a single multi-channel recording head, such as the recording head 31 shown in FIGS. 1 and 3, wherein four separate electromagnetic recording units of any suitable conventional type comprise the means for recording magnetic bits on a suitable magnetic memory member. Also for illustrative purposes, the present invention is shown as utilizing a suitable magnetic tape 32, which is adapted to be transported from a suitable pay-out reel 33 and passed over a recording face 31' of the recording head 31.

Figure 5:
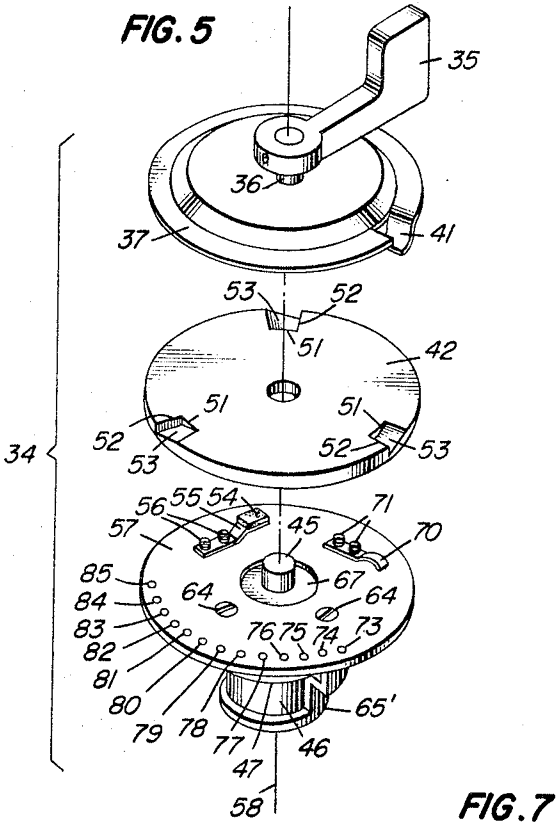
FIG. 5 is an exploded perspective view of a read-out or commutator switch including the driving clutch means and the cooperating drive for the tape reels and the recording tape.
Figure 6:
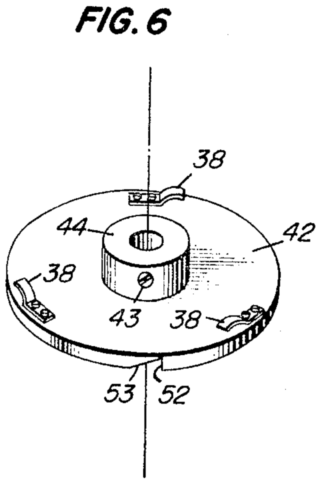
FIG. 6 is a perspective view of the underside of the driving plate of the clutch shown in FIG. 5 illustrating the read-out switch contactors.

In order to assure a uniform operation of the magnetic digital recorder and to provide for substantially equal advance steps for the recording of each symbol on the magnetic tape 32, a mechanism is provided which is adapted to draw the magnetic tape 32 over the recording head face 31' a predetermined step in response to the recording operation for each symbol corresponding to each symbol switch 10 through 19, and including an initial starting symbol and an end-of-word symbol. This mechanism may conveniently be included in a read-out or commutator switch 34 shown in detail in FIGS. 5, 6, and 7. This read-out switch is provided with an operating handle 35 secured to an operating shaft 36 in any suitable manner and drivingly connected through the shaft 36 to a one-way clutch drive plate 37, FIGS. 5 and 7. The read-out switch is constructed so that a complete recordation of a word, including the initial symbol indicating the start of a word, a symbol for each of the ten symbol switches, and the end-of-word symbol must be made before the recordation of a new word can be initiated. In other words, the read-out switch is constructed so as to prevent the start of recordation of a new word before completion of recording of an end-of-word record. This is very important as it eliminates the possibility of an incomplete entry for one word and a subsequent overlapping of an entry for another word which would give a recordation which could not be utilized by a computer with which the magnetic tape record is adapted to be used. If an operator inadvertently failed to operate the read-out switch so as to make a complete recording of a word and subsequently the symbol switches 10–19 were to be set for the recordation of a new word, the operator would be unable to enter the new word and the operator thus would know that a faulty recordation had been made for the last previous entry and a correction could therefore immediately be made in the record. Provision for automatically eliminating the erroneous entry by a computer and substituting therefor a correct entry also is incorporated in this recorder, as will be explained later.

This compulsory complete word recordation feature is obtained by use of a one-way drive clutch which operably connects the read-out switch operating handle 35 to read-out switch contactors 38. In the schematic diagram shown in FIG. 1, only one of the read-out switch contactors 38 is shown since these contactors all are alike and are connected to ground through the one-way clutch and its mounting on the housing 30. In order further to assure an entry of a complete word for each recordation, it has been found desirable to provide for such complete recordation by the movement of the read-out switch operating handle through only a fraction of a complete revolution. Approximately 120° of arc provides a convenient extent of movement for the read-out switch handle 35 for each recordation. This movement of the switch handle 35 may be limited in any suitable manner as by a pair of stops 39 and 40, preferably spaced slightly more than 120° apart and mounted on the top of the housing 30.

Details of the clutch are not per se part of this invention and are described and illustrated to facilitate an understanding of the complete recorder. This clutch is illustrative of a convenient driving connection but is not necessarily the only practical clutch for the intended purposes. As is more clearly shown in FIG. 5, the clutch drive plate 37 is formed with a pawl drive element 41 which may simply be formed as a tab punched and bent outwardly from the drive plate 37. The drive through the one-way clutch is provided from the drive shaft 36 through the pawl 41 to a driven clutch plate 42. This driven clutch plate is drivingly mounted in any suitable manner, as by a set screw 43 extending through a hub 44, on a driven shaft 45.

Figure 7:
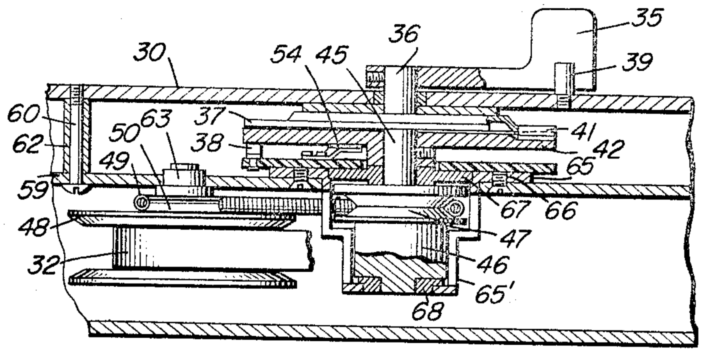
FIG. 7 is a fragmentary sectional view, taken along lines 7—7 of FIGS. 2 and 3, illustrating a tape reel, and the read-out switch and its driving connections to the tape reel.

As is more clearly seen in FIG. 7, the drive shaft 45 may conveniently be formed integral with a capstan 46 for directly transporting the magnetic tape across the recording head 31. A drive pulley 47 also may be integrally formed with the shaft 45 or may be separately mounted thereon to provide a drive for a tape take-up reel 48 through a suitable connection, such as a spring belt 49 and a reel pulley 50.

The clutch driven plate 42 is formed with three equally spaced recesses 51 on the face thereof adjacent to the drive plate 37. Each of these recesses is formed with a drive face 52 extending substantially perpendicular to the face of the driven plate 42 and spaced substantially 120° apart. Each recess also preferably is formed with a tapered guide surface 53 extending circumferentially from the inner edge of the drive face 52 to the face of the driven plate 42 adjacent to the drive plate 37 and in a direction opposite to the direction of drive. A positive mechanical driving connection is provided between the drive plate 37 and the driven plate 42 through the pawl 41 by engagement of the end of the pawl with the drive face 52 of one of the recesses 51. Rotation of the switch handle 35 from the starting position adjacent to the stop 39 to the stop 40 turns the drive shaft 36, and consequently the pawl 41, through an angle which preferably is slightly greater than 120°. This provides a mechanical drive of the driven shaft 45 through the driven plate 42 and thereby assures a predetermined angular rotation of the capstan 46 for each complete operation of the read-out switch handle 35 between the stops 39 and 40. This predetermined advance of the capstan 46 is utilized to assure a predetermined advance step of the magnetic tape 32 past the recording head face 31' for each complete word recorded.

Before any further drive can be provided through the clutch, the actuating handle 35 must be rotated in a reverse direction from a position in engagement with stop 40 to a position substantially in engagement with stop 39. Such reverse rotation of the handle 35 causes the resilient pawl 41 to slip upwardly out of the recess 51 over the tapered lead-out guide surface 53 and the adjacent surface of the driven plate 42 until it falls into another recess 51 into which it is inherently resiliently biased. Since the angle between the stops 39 and 40 is slightly greater than the desired angle of advance of 120° between adjacent drive faces 52 of the recesses 51, a full return of the actuating handle 35 from a position in engagement with stop 40 to a position in engagement with stop 39 will cause the pawl 41 to engage the tapered surface 53 a slight distance away from the driving face 52. This assures a complete actuation of the read-out switch for each operation of the handle 35 and produces a slight lost motion at the beginning of each operation of the handle 35 until the end of the pawl 41 engages the driving face 52 of the recess 51 into which it extends.

In order to assure against any backward rotation of the clutch driven plate 42 by the return rotation of the pawl 41 after each read-out operation, a friction brake preferably is provided for exerting a slight drag on the clutch driven plate 42 sufficient to prevent backward slippage of this plate during the reverse rotation of the handle 35 and the tab 41. Such a friction brake conveniently may take the form of a simple friction pad or shoe 54 of any suitable material, which is lightly resiliently biased continuously into engagement with the adjacent surface of the driven clutch plate 42. This light bias may be provided in any suitable manner, as by a small leaf spring 55, which may be secured in any suitable manner, as by screws 56, to the adjacent surface of an insulating stationary plate 57 which is rigidly mounted on the recorder casing. Since read-out switch contactors 38 are mounted on the adjacent surface of the clutch plate 42, the brake friction pad 54 is mounted nearer the axis 58 of the read-out switch than the contactors 38 in order to assure against interference therebetween.

Preferably, the read-out switch mechanism, the recording head 31, and the magnetic tape transport, including the reels 33 and 48, are mounted on a separate casing 59 which can be readily mounted in and demounted from the main recorder casing 30 by suitable fastening means such as screws 60 extending through suitable openings 61. As shown in FIG. 7, the casing 59 is properly spaced from the recorder housing 30 by suitable spacers 62 arranged between the adjacent surfaces of the casing 59 and the housing 30 and held in position by the screws 60. This provides an arrangement which facilitates the assembly of the recorder and also provides for ready access to the operating mechanism for possible repairs and adjustment. The reel 48 is rotatably mounted on a suitable bearing 63 mounted on the casing 59, and the read-out switch insulating plate 57 is secured in any suitable manner, as by screws 64, to a mounting bracket flange 65 fastened in a convenient manner, as by screws 66, to the casing 59. The driven shaft 45 is rotatably supported by suitable bearings 67 and 68 which are supported in the mounting bracket 65' preferably integrally formed with the bracket flange 65. This fastens the entire read-out switch securely to the casing 59 and provides a convenient rotatable support for the rotatable parts of the switch.

The desired electrical connections between the read-out switch and a suitable source of energization, such as a battery 69, are provided through a flexible contactor 70 mounted in any suitable manner, as by screws 71, on the insulating plate 57. One of the screws 71 also may be used to secure the electrical connection 72 of the battery 69 to the contactor 70. This contactor 70 is adapted to provide an electrical contact with the clutch driven plate 42, which is grounded through the shaft 45 on which it mounted and the pawl 41 and clutch driven plate 37 which provides an electrical connection to the recorder housing 30. As shown in FIG. 1, the terminal of the battery 69 connected to the contactors 38 on the clutch driven plate 42 is the grounded side of the battery. Turning of the read-out switch handle 35 provides for the turning of the clutch driven plate 42 and the contactors 38 carried thereby, so that each of the contactors 38 in turn will sequentially pass over and provide an electrical connection with the thirteen button contacts 73–85 for each complete actuation of the switch handle between the stops 39 and 40. This also provides for a predetermined advance step of the magnetic tape 32 over the recording face 31 of the recording head 30, thus assuring a substantially constant length of tape for each complete word recorded thereon.

Figure 3:
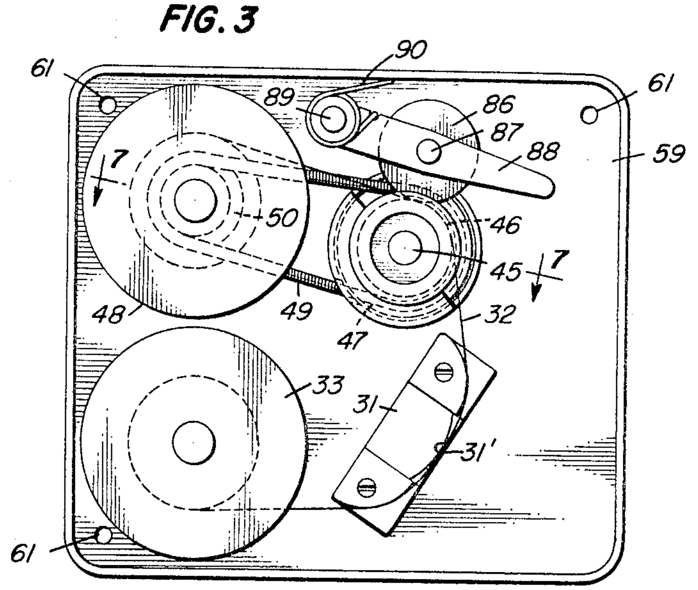
FIG. 3 is a plan view of the underside of a part of the magnetic digital recorder shown in FIG. 2, with the bottom cover of the casing removed, illustrating the relative arrangement of the reels for the magnetic tape, the recording head, and the driving mechanism for transporting magnetic tape through the recorder.

The advance of the tape in this desired predetermined manner is obtained by passage of the tape 32 from the pay-out reel 33, over the recording face 31 and the capstan 46 in direct frictional engagement therewith, and onto the take-up reel 48. Since the diameter of the magnetic tape wound on the take-up reel 48 progressively increases as the tape is wound thereon, it is essential that the transport of the tape over the recording face 31' should not be determined by the operation of the take-up reel 48 and that it be actuated by means which will assure a substantially predetermined advance step for each word recorded thereon. This is obtained by driving the take-up reel 48 through the spring belt 49, which extends around the capstan pulley 47 and the take-up reel pulley 50 and provides for a certain amount of slippage between these two pulleys, while the magnetic tape 32 is drawn a substantially constant advance step by its frictional engagement with the surface of the capstan 47. In order further to assure the substantially constant advance step of the tape 32 for each word recorded thereon, a roller 86 is rotatably mounted on a stub shaft 87 carried on a lever 88 pivotally mounted on a shaft 89 secured to the casing 59 and resiliently biased by a spring 90 into engagement with the outer surface of the magnetic tape 22 and against the capstan 46. This increases the frictional engagement of the magnetic tape 32 with the capstan 46 and assures a measured advance step of the tape 32 in accordance with the rotation of the capstan. It also provides a braking force which holds the tape 32 against being drawn by the take-up reel 48 and thereby assures maintaining the magnetic tape 32 taut between the capstan 46 and the take-up reel 48. As shown in FIG. 3, the lever 88 preferably is longer than necessary merely to support the shaft 87 so that it provides a convenient means for lifting the roller 86 out of engagement with the tape 32 and capstan 46 in order to facilitate threading of new tape between the reels 33 and 48 and over the recording head 31 and the capstan 46.

Figure 4:
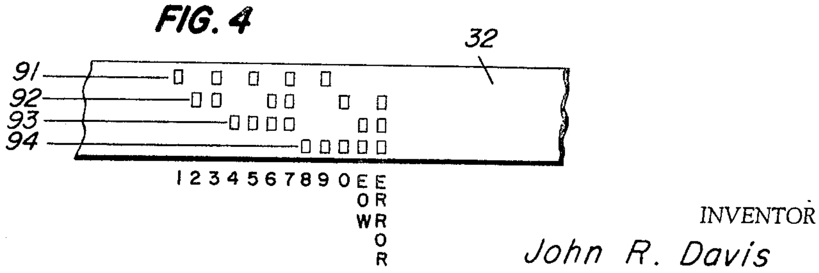
FIG. 4 is a plan view of a fragmentary section of tape schematically showing magnetic bits illustrative of recordations of various coded symbols as indicated in this figure.

In accordance with the present invention, provision is made for the recordation of a symbol indicative of the beginning of each new word to be recorded. This symbol could comprise any suitable magnetic recordation on the memory member and conveniently may be formed by a combination of symbols indicative of zero. In the illustrated embodiment, this is shown in connection with a 1–2–4–8 modified binary code, which is used for recording desired information, utilizing a four-channel recording head. FIG. 4 illustrates a section of magnetic tape on which four track records 91, 92, 93 and 94 are shown, which may be formed by the proper energization of magnetizing coils 95, 96, 97, and 98, respectively, of the four-channel recording head. Energization of the magnetizing coil 95 will produce a single magnetized bit in track 91 which may be coded to represent the digit "1." Magnetizing coil 96, when energized, will produce a single magnetic bit in track 92 coded to represents the digit "2." Similarly, magnetizing coils 97 and 98, when energized, will produce magnetic bits on magnetic tape 32 in tracks 93 and 94, respectively, coded to represent the digits "4" and "8." Thus, energization of coil 95 alone will produce a magnetic bit representing the digit "1," energization of coil 96 alone will produce a magnetic bit representing the digit "2," energization of coils 95 and 96 simultaneously will produce transversely aligned bits in tracks 91 and 92 representing the digit "3," energization of coil 97 alone will produce a magnetic bit in track 93 representing the digit "4," and simultaneous energization of coils 95 and 97 will produce a combination of aligned bits in tracks 91 and 93 representing the digit "5." In like manner, simultaneous energization of coils 96 and 97 will produce aligned bits in tracks 92 and 93 representing the digit "6," and simultaneous energization of coils 95, 96, and 97 will produce aligned bits in tracks 91, 92, and 93 representative of the digit "7." Finally, energization of coil 98 alone will produce a single bit in track 94 representing the digit "8," and simultaneous energization of coils 95 and 98 will produce aligned bits in tracks 91 and 94 representing the digit "9." A combination of bits in tracks 92 and 94 can be used to represent "0" by simultaneously energizing coils 96 and 98. In order to provide an instruction to a computer that a complete word has been received by the computer it is desirable to supply a signal which will designate the end of a word. This may conveniently be provided by a code using a combination of bits in tracks 93 and 94 by energizing the magnetizing coils 97 and 98 of the recording head.

The improved and simplified recorder utilizing the circuitry shown in FIG. 1 will provide a recordation of a zero on magnetic tape 32 at the beginning of each word as the read-out switch handle 35 is moved from the stop 39 toward the stop 40. This moves the contactor 38 into engagement with the contact 74 which is permanently connected to the recording head magnetizing coils 96 and 98 through diodes 99 and 100 respectively, the remaining diodes 101 through 114 preventing energization of the other two magnetizing coils 95 and 97. As the read-out switch handle 35 is moved from the stop 39 to the stop 40 it progressively makes contact between the contactor 38 and the button contacts 75 through 84, which are respectively connected to the ten symbol switches 10 through 19. Since each of the symbol switches is provided with ten contacts, 20 through 29, for energizing the magnetizing coils 95, 96, 97, and 98 singly or in combinations to produce magnetic bits symbolic of the digits "1" through "9" and "0," energization of each respective symbol switch by engagement of its button contact on the read-out switch by the contactor 38 will produce a magnetic bit or bits on the tape 32 in accordance with the setting of the contactor of the symbol switch thus energized.

Since the tape 32 is transported across the recording face 31' of the recording head 31 in accordance with the turning of the capstan 46 by the read-out switch handle 35, the symbol recorded for each of the symbol switches 10 through 19 will be substantially equally spaced longitudinally of the tape 32. After all of the ten symbol switches have been energized successively through the read-out switch 34, the contactor 38 engages the last button contact 85 which is permanently connected to magnetizing coils 97 and 98 through diodes 111 and 114, thereby recording magnetic bits in tracks 93 and 94 on the magnetic tape 32, thus providing an end-of-word recordation on the tape.

If an error is detected in the setting of any of the symbol switches 10 through 19, such an error can be corrected by simply resetting the respective symbol switch if a recordation of a word has not yet been begun. If a recordation has been begun and an error is detected or if an error is detected after a recordation has been completed, it is desirable to provide a computer with an instruction to disregard the last preceding word and to substitute the next succeeding word in its place. Since it is not possible to begin a new word without completing the last previous word, it will be necessary in every instance to move the read-out switch handle 35 completely to the stop 40 before a corrected entry can be made. Thus, in every instance when a recordation is begun, bits will be entered on the magnetic tape 32 representative of all ten of the symbol switches 10 through 19 and representative of the end-of-word symbol provided by the energization of the magnetizing coils 97 and 98 through the button contact 85. The desired instruction to disregard the last preceding entry and to substitute therefor the next succeeding entry may conveniently be provided by substituting for the zero symbol normally recorded at the beginning of each word, a symbol which may be termed an error symbol and which may conveniently be represented by transversely aligned magnetic bits in tracks 92, 93, and 94 made by the simultaneous energization of magnetizing coils 96, 97, and 98. Since the coils 96 and 98 always are energized in the first position of the read-out switch by engagement of the contactor 38 with the button contact 74, it is only necessary to provide for the additional energization of magnetizing coil 97 at this first position of the contactor 38. This may conveniently be done by providing a push-button switch 115 which is normally open and is permanently connected to the read-out switch button contact 74 and to the magnetizing coil 97 through diode 112. If an erroneous entry or setting of the symbol switches is discovered before a subsequent proper entry has been made, the improperly set symbol switch can be set to its correct designation and the read-out switch handle turned first completely to the stop 40, if this has not already been done, and returned to its starting position at the stop 39. The error button 115 then is depressed closing the circuit therethrough and the read-out switch handle 35 is moved in the usual manner from the stop 39 to the stop 40. This will provide a recordation of the error symbol, as shown in FIG. 4, at the beginning of the new word, followed by a recording of the correct symbols for the ten symbol switches 10 through 19.

In some instances it may be found desirable to reserve one of the symbol switches, preferably the switch 10 or 19, to provide a recordation at the beginning or end of a word indicative of special instructions. These instructions would be coded in accordance with the digits of the other switches and could represent any desired coded set of instructions. One such convenient instruction would be an instruction that several consecutive entries are incorrect and the correct entries to be substituted therefor are to be found in a particular folio reserved for this purpose. The correct entries could then be manually written in the folio and a suitable correction be made when the instruction is received by a computer.

The provision of diodes 99 through 114 connected between the various contacts 20 through 29 of each of the symbol switches 10 through 19, to the read-out switch contacts 74 and 85, and to the error button switch 115 provides a simple economical and very compact arrangement for assuring the energization of only the magnetizing coil or coils of the recording head 31 to provide for the entry of the proper magnetic bit on the tape 32 and to prevent energization of the other magnetizing coils of the recording head. These diodes preferably are of the small semiconductor type which greatly reduce the size and weight of the recorder and provide a sturdy, long-lasting construction which is especially practical in portable recorders which may be used for various purposes, such as, recording meter readings, taking inventories, and making tallies in freight yards, etc. The interconnection of the four magnetizing coils 95, 96, 97, and 98 of the recording head to the diode matrix including the diodes 101 through 114 and through this matrix respectively to the various symbol switches, the read-out switch 34, the error switch 115 and the battery 69 preferably includes current limiting resistors 116, 117, 118, and 119 in the circuit of the respective magnetizing coils 95, 96, 97, and 98 to assure against possible injuriously high current should one or more of these magnetizing coils be accidentally grounded.

An instrument made in accordance with the present invention provides a simplified recorder which utilizes a multi-channel recording head which is adapted to be energized through a plurality of symbol switches by the successive connection of these switches to a source of energization through a read-out switch which simultaneously advances a magnetic tape memory member across the recording head during the recording and utilizes a minimum of movable operating parts thereby providing for a maximum efficiency and long life combined in a relatively lightweight small portable instrument. A plurality of recording heads, other diodes than the semiconductor type, and a different number or combination of symbol switches can readily be used, where these may be found desirable.

While a particular embodiment of this invention has been illustrated and described, modifications thereof will occur to those skilled in the art. It is to be understood, therefore, that this invention is not to be limited to the particular details described and shown, and it is intended in the appended claims to cover all modifications within the spirit and scope of this invention.

What is claimed is:

1. A magnetic digital recorder comprising a multichannel recording head, a reel assembly for passing magnetic tape past said head, means including a plurality of symbol switches for providing an electrical connection through each switch to one or more predetermined channels of said recording head in accordance with the symbol to be recorded, means for energizing said recording head through said symbol switches in a fixed sequence and for operating said reel assembly to advance the tape across said recording head during a recording cycle, and means for energizing predetermined selected channels of said recording head for making an error record at an end of said fixed sequence symbol switch energization of the recording head.

2. A magnetic digital recorder comprising a multichannel recording head, a plurality of symbol switches, each symbol switch having a plurality of contacts and being operable to a plurality of positions for closing circuits through said contacts, means including a diode matrix for connecting said contacts of each symbol switch to one or more selected channels of said recording head in accordance with the symbol represented by the respective contact of each respective switch and preventing energization of other channels, read-out means for advancing a magnetizable member a substantially predetermined step across said recording head for each recording and for concurrently sequentially energizing said symbol switches for a portion of each step of the magnetizable member for each recording whereby the selected channel or channels of said recording head are energized and the respective symbol is recorded on the magnetizable member corresponding to the position of the energized symbol switch, and means for energizing predetermined channels for recording an error symbol.

3. A magnetic digital recorder as defined in claim 2 wherein said read-out means prevents recording of a new word before completion of the recording through all of said symbol switches.

4. A magnetic digital recorder as defined in claim 2 wherein said read-out means includes means for making an end-of-word record by predetermined channel energization of said recording head after completing the symbol switch recordings.

5. A magnetic digital recorder as defined in claim 4 wherein said read-out means includes means preventing initiation of recordation of a new word before completion of recording of the end-of-word record.

6. A magnetic digital recorder comprising a multichannel recording head, a plurality of symbol switches, each symbol switch having a plurality of contacts corresponding to selected information symbols and being operable to a plurality of positions for closing circuits through said contacts, means including a diode matrix for connecting said contacts of said symbol switches to one or more selected channels of said recording head in accordance with the symbol represented by the respective contact of each respective switch and for preventing energization of other channels, and read-out means for sequentially energizing said symbol switches, said read-out means comprising means for advancing a magnetizable member a substantially predetermined step across said recording read for the recording through each symbol switch and for concurrently respectively providing said energization of each symbol switch for a substantially predetermined fraction of the length of each step of the magnetizable member for each recording whereby the selected channel or channels of said recording head are respectively energized and each recording on the magnetizable member corresponds to the symbol represented by the position of the respectively energized symbol switch.

7. A magnetic digital recorder comprising a multichannel recording head, a plurality of symbol switches, each symbol switch having a plurality of contacts corresponding to selected information symbols and being operable to a plurality of positions for closing circuits through said contacts, means including a diode matrix for connecting said contacts of said symbol switches to one or more selected channels of said recording head in accordance with the symbol represented by the respective contact of each respective switch and for preventing energization of other channels, and read-out means for sequentially energizing said symbol switches for recording a complete word, said read-out means comprising means for advancing a magnetizable member of substantially predetermined step across said recording head for the recording through each symbol switch and for concurrently providing said energization of each respective symbol switch for a fraction of each step of the magnetizable member for each recording whereby the selected channel or channels of said recording head are respectively energized and each recording on the magnetizable member corresponds to the symbol represented by the position of the respectively energized symbol switch, said read-out mean providing for energization of channels of said recording head for recording an end-of-word symbol at the end of each recorded word independently of said symbol switches and through said diode matrix.

8. A magnetic digital recorder comprising a multichannel recording head, a plurality of symbol switches, each symbol switch having a plurality of contacts corresponding to selected information symbols and being operable to a plurality of positions for closing circuits through said contacts, means including a diode matrix for connecting said contacts of said symbol switches to one or more selected channels of said recording head in accordance with the symbol represented by the respective contact of each respective switch and for preventing energization of other channels, read-out means for sequentially energizing said symbol switches for recording a complete word, said read-out means comprising means for advancing a magnetizable member a substantially predetermined step across said recording head for each recording and for concurrently respectively providing said energization of each symbol switch for a portion of each step of the magnetizable member for each recording whereby the selected channel or channels of said recording head are respectively energized and the recording on the magnetizable member corresponds to the symbol represented by the position of the energized symbol switch, said read-out means including means providing for energization of channels of said recording head for selectively recording a zero symbol at the start of each new word when the last previous word is correct and operable to record an error symbol in lieu of said zero symbol at the start of a word when an erroneous recording has been made whereby the last previous recorded word will be disregarded by a computer and the ensuing word substituted therefor.

9. A magnetic digital recorder as defined in claim 8, wherein said read-out means includes means for making an end-of-word record by predetermined channel energization of said recording head after completing the symbol switch recordings.

10. A magnetic digital recorder comprising a multichannel recording head, a plurality of symbol switches, each symbol switch having a plurality of contacts corresponding to selected information symbols and being operable to a plurality of positions for closing circuits through said contacts, means including a diode matrix for connecting said contacts of said symbol switches to one or more selected channels of said recording head in accordance with the symbol represented by the respective contact of each respective switch and for preventing energization of other channels, read-out means for sequentially energizing said symbol switches for recording a complete word, said read-out means comprising means for advancing a magnetizable member a substantially predetermined step across said recording head for each recording and for concurrently respectively providing said energization of each symbol switch for a portion of each step of the magnetizable member for each recording whereby the selected channel or channels of said recording head are respectively energized and the recording on the magnetizable member corresponds to the symbol represented by the position of the energized symbol switch, said read-out means providing for energization of channels of said recording head for recording a zero symbol at the start of each new word independently of said symbol switches and through said diode matrix, and means for recording an error symbol in lieu of said zero symbol at the start of a word whereby the last previous recorded word will be disregarded by a computer and the ensuing word substituted therefor.

11. A magnetic digital recorder as defined in claim 10 wherein said read-out means includes means preventing initiation of recordation of a new word before completion of recording of the end-of-word record.

12. A magnetic digital recorder including a four-channel magnetic recording head, a plurality of multiple contact switches, means for advancing magnetic tape past said head in substantially regular steps and for concurrently sequentially energizing said symbol switches, means including a diode matrix providing connections from four contacts of each symbol switch respectively to a different one of said four head channels and preventing simultaneous energization of more than the respective one head channel through said diode matrix connections, said diode matrix providing other connections from at least five other contacts of each symbol switch respectively to a different combination of two of said four head channels for each of said five other contacts and preventing simultaneous energization of more than the respectively connected two channels through said diode matrix connections, said diode matrix providing further connections from at least one further contact of each symbol switch respectively to a combination of three of said four head channels for each of said further contacts and preventing simultaneous energization of the fourth of said channels through said diode matrix connections, and read-out means for sequentially energizing said symbol switches.

References Cited by the Examiner

UNITED STATES PATENTS

| | | | |
|---|---|---|---|
| 1,800,019 | 4/1931 | Hewett | 346—34 X |
| 2,398,988 | 4/1946 | Ziebolz | 346—34 X |
| 2,808,984 | 10/1957 | Marshall et al. | 340—347 X |
| 2,864,557 | 12/1958 | Hobbs | 340—347 X |
| 2,896,713 | 7/1959 | Gerdemann | 340—166 X |
| 3,103,401 | 9/1963 | Daniels et al. | 346—17 |

BERNARD KONICK, *Primary Examiner.*

IRVING L. SRAGOW, *Examiner.*

M. K. KIRK, J. F. BREIMAYER, *Assistant Examiners.*